United States Patent
Gogotsi et al.

(10) Patent No.: US 8,038,926 B2
(45) Date of Patent: Oct. 18, 2011

(54) METHOD FOR MAKING CARBON NANOTUBES WITH EMBEDDED NANOPARTICLES

(75) Inventors: Yury Gogotsi, Warminster, PA (US); Davide Mattia, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 105 days.

(21) Appl. No.: 12/398,315

(22) Filed: Mar. 5, 2009

(65) Prior Publication Data

US 2009/0224435 A1   Sep. 10, 2009

Related U.S. Application Data

(60) Provisional application No. 61/034,564, filed on Mar. 7, 2008.

(51) Int. Cl.
*B06B 1/20* (2006.01)
(52) U.S. Cl. ........... 264/492; 264/81; 977/745; 977/748
(58) Field of Classification Search .................... 264/81, 264/442; 977/745, 748
See application file for complete search history.

(56) References Cited

U.S. PATENT DOCUMENTS

2005/0276743 A1* 12/2005 Lacombe et al. .......... 423/447.3
2007/0034052 A1*  2/2007 Vanheusden et al. ............ 75/362

OTHER PUBLICATIONS

Mattia et al. (Multifunctional carbon nanotubes with nanoparticles embedded in their walls. Nanotechnology 18 (2007) pp155305).*
Korneva et al. (Carbon Nanotubes Loaded with Magnetic Particles, Nano Letters (2005) vol. 5 No. 5 pp. 879-884).*
Yu et al. "Synthesis of NiO-embedded carbon nanotubes using corona discharge enhanced chemical vapor deposition." Diamond and Related Materials 15 (2006) pp. 1217-1222.*
Cho, et al., Creating, transporting, cutting, and merging liquid droplets by electrowetting-based actuation for digital microfluidic circuits, Journal of Microelectromechanical Systems, Feb. 2003; 12(1): 70-80.
Dou et al., Surface-Enhanced Raman Scattering of Biological Molecules on Metal Colloid II: Effects of Aggregation of Gold Colloid and Comparison of Effects of pH of Glycine Solutions Between Gold and Silver Colloids, Applied Spectroscopy, 1999, vol. 53, No. 11, 1440-1447.
Ebbesen, Thomas W., Wetting, Filling and Decorating Carbon Nanotubes, Journal of Physics and Chemistry of Solids, 1996; 57(6-8):951-955.
Fradette et al., Gas/Liquid Dispersions With a SMX Static Mixer in the Laminar Regime, Chemical Engineering Science 2006; 61(11): 3506-3518.
Gao et al., Magnetic Carbon Nanotubes: Synthesis by Electrostatic Self-Assembly Approach and Application in Biomanipulations, Journal of Physical Chemistry B. 2006; 110(14): 7213-7220.
Graham et al., Magnetoresistive-based Biosensors and Biochips, Trends in Biotechnology, Sep. 2004; 22(9): 455-462.

(Continued)

*Primary Examiner* — Yogendra Gupta
*Assistant Examiner* — Robert J Grun
(74) *Attorney, Agent, or Firm* — Woodcock Washburn, LLP

(57) ABSTRACT

The invention concerns methods for producing carbon nanotubes with embedded nanoparticles comprising providing a template comprising an anodized aluminum oxide membrane with a pore diameter of 20-200 nm; contacting the template with a solution containing nanoparticles; exposing the template and solution containing nanoparticles to sonication; removing the template from the solution; forming a carbon structure via chemical deposition of carbon on said template; and removing the template by exposing the template to a basic solution.

20 Claims, 10 Drawing Sheets

OTHER PUBLICATIONS

Hattori, et al., Carbon-Alloying of the Rear Surfaces of Nanotubes by Direct Fluorination, Carbon 1999; 37(7):1033-8.

Hofer et al., Saturation Magnetizations of Iron Carbides, Journal of American Chemical Society 1959, 81, 1576-82.

Kim et al., Filling Carbon Nanotubes With Particles, Nano Letters, 2005; 5(5): 873-878.

Korneva et al., Carbon Nanotubes Loaded With Magnetic Particles, Nano Letters, 2005; 5(5): 879-884—English-Language Abstract.

Kyotani et al., Chemical Modification of the Inner Walls of Carbon Nanotubes by HNO3 Oxidation, Carbon 2001; 39: 782-5.

Kyotani et al., Formation of Ultrafine Carbon Tubes by Using an Anodic Aluminum Oxide Film as a Template, Chemistry of Materials, Aug. 1995; 7(8): 1427-8.

Majumder, et al., Enhanced Flow in Carbon Nanotubes, Nature, Nov. 2005; 438(7064): 44.

Mattia, et al., Effect of Graphitization on the Wettability and Electrical Conductivity of CVD-Carbon Nanotubes and Films, Journal of Physical Chemistry B., 2006; 110(20): 9850-9855.

Mattia et al., Wetting of CVD Carbon Films by Polar and Nonpolar Liquids and Implications for Carbon Nanopipes, Langmuir 2006, 22, 1789-1794.

McFarland, et al., Color My Nanoworld, Journal of Chemical Education, Apr. 2004; 81(4): 544A-544B.

Mu, et al., Hydrogen Storage in Carbon Nanotubes Modified by Microwave Plasma Etching and Pd Decoration, Carbon 2006; 44(4): 762-7.

Pieczonka et al., Inherent Complexities of Trace Detection by Surface-Enhanced Raman Scattering, ChemPhysChem 2005; 6(12): 2473-84.

Rakov, E.G., Chemistry of Carbon Nanotubes, in Gogotsi Y, ed., *Carbon Nanomaterials*, CRC Press, 2006, pp. 77-147.

Riegelman et al., Controlled Nanoassembly and Construction of Nanofluidic Devices, Journal of Fluids Engineering. Jan. 2006; 128(1): 6-13.

Rossi et al., Environmental Scanning Electron Microscopy Study of Water in Carbon Nanopipes, Nano Letters, May 2004; 4(5): 989-93—English-language Abstract.

Turkevich et al., A Study of the Nucleation and Growth Processes in the Synthesis of Colloidal Gold, Discussions of the Faraday Society, 1951, 11, 55-75.

Yu, et al., Synthesis of NiO-embedded Carbon Nanotubes Using Carona Discharge Enhanced Chemical Vapor Deposition, Diamond and Related Materials 15, (2006) 1217-1222.

Zhao, et al., The Growth of Carbon Nanostructures in the Channels of Aligned Carbon Nanotubes, Carbon 2006; 44(7): 1310-3.

* cited by examiner a b c d e

METHOD FOR MAKING CARBON NANOTUBES WITH EMBEDDED NANOPARTICLES

CROSS-REFERENCE TO RELATED APPLICATIONS

This application claims the benefit of U.S. Provisional Application No. 61/034,564 filed Mar. 7, 2008, the entirety of which is incorporated by reference herein.

STATEMENT OF GOVERNMENT RIGHTS

The invention was made with U.S. Government support through the National Science Foundation under federal grant number NSF CTS 0210579. Accordingly, the Government has certain rights in the disclosed inventions.

TECHNICAL FIELD

The instant invention concerns, inter alia., methods for making carbon nanotubes having embedded particles.

BACKGROUND

Carbon nanotubes (CNT) have elongated tubular bodies which are typically only a few atoms in circumference. Carbon nanotubes are hollow and typically have a linear fullerene structure. The length of the carbon nanotubes potentially may be thousands or millions of times greater than their diameter. Both single-walled carbon nanotubes (SWNT) and multi-walled carbon nanotubes (MWNT) are known in the art.

Decoration of the walls of carbon nanotubes with functional groups and/or nanoparticles has been performed to add additional functionality to carbon nanotubes. See, Ebbesen, J. Phys. Chem. Sol. 1996; 57(6-8):951-5 and Rakov, Chemistry of Carbon Nanotubes In: Gogotsi Y, editor, Nanomaterials Handbook, Boca Raton, Fla.: CRC Press; 2006, p. 105-75. In the recent years, decoration of CNT has been used to increase the hydrogen storage capacity (Mu, et al., Carbon 2006; 44(4): 762-7), to make nanotubes magnetic (Gao, et al., J. Phys. Chem. B. 2006; 110(14): 7213-20), and to grow secondary structures inside the nanotubes to increase the available surface for catalysis (Zhao, et al., Carbon 2006; 44(7): 1310-3). Functionalization of the interior walls of carbon nanotubes, in particular those produced using a non-catalytic template-assisted chemical vapor deposition method (CVD), has been achieved using different methods, such as direct fluorination (Hattori, et al., Carbon 1999; 37(7): 1033-8), nitric acid treatment (Kyotani, et al., Carbon 2001; 39: 782-5), and filling with magnetic (Komeva, et al., Nano Lett. 2005; 5(5): 879-84) and fluorescent nanoparticles (Kim, et al., Nano Lett. 2005; 5(5): 873-8). Despite the work that has been done in this area, there is a need for more efficient processes for functionalizing nanoparticles.

SUMMARY

In some aspects, the invention concerns methods for producing carbon nanotubes with embedded nanoparticles comprising:
  providing a template comprising an anodized aluminum oxide membrane with a pore diameter of 20-200 nm;
  contacting the template with a solution containing nanoparticles;
  exposing the template and solution containing nanoparticles to sonication;
  separating the template from the solution;
  forming a carbon structure via chemical deposition of carbon on the template; and
  removing the template by exposing the template to a basic solution.

In some embodiments, the chemical deposition of carbon is achieved by chemical vapor deposition (CVD). For some methods, the template can be dried after the template is removed from the solution. One basic solution useful in the methods is aqueous sodium hydroxide.

Any suitable nanoparticle can be used in the invention. Useful nanoparticles include gold, iron oxide, and SiC. One suitable iron oxide is $Fe_3O_4$.

Other aspects of the invention concerns methods for producing carbon nanotubes with embedded nanoparticles comprising:
  providing a template;
  contacting the template with a solution containing nanoparticles;
  exposing the template and solution containing nanoparticles to sonication;
  separating the template from the solution;
  forming a carbon structure via chemical deposition of carbon on the template; and
  removing the template by exposing the template by chemical treatment.

In some embodiments, the template comprises an anodized aluminum oxide membrane with a pore diameter of 20-200 nm and the template is removed via exposure to basic solution. In these methods, the nanoparticles, templates, and methods described herein can be utilized.

Other aspects of the invention concern methods for producing carbon nanotubes with embedded nanoparticles comprising:
  providing a template comprising an anodized aluminum oxide membrane with a pore diameter of 20-200 nm;
  contacting the template with a solution containing nanoparticles;
  exposing the template and solution containing nanoparticles to sonication;
  separating the template from the solution;
  drying the template;
  forming a carbon structure via chemical deposition of carbon on the template; and removing the template by exposing the template to a basic solution.

In these methods, the nanoparticles, templates, and methods described herein can be utilized.

DETAILED DESCRIPTION OF ILLUSTRATIVE EMBODIMENTS

Figure 1:
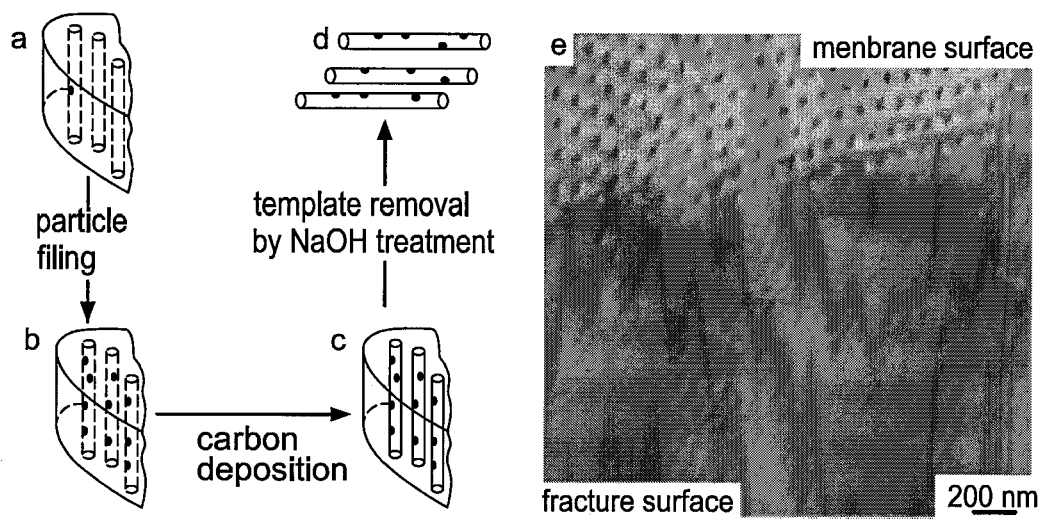
FIG. 1 presents schematics of synthesis of CVD-nanotubes with nanoparticles embedded in the walls: a) an empty membrane is b) filled with nanoparticles in solution. c) nanotubes are deposited inside the pores of the membrane through CVD. d) free-standing CNTs with particles embedded in the walls are obtained after dissolution of the membrane. e) SEM micrograph of an $Al_2O_3$ membrane after CVD synthesis showing both the surface (top) and the fracture surface (below).

The present invention is illustrated by reference to the detailed description. It should be understood that the scope of the claims is not limited to the specific devices, methods, conditions or parameters illustrated herein. In addition, the terminology used herein is for the purpose of describing particular embodiments by way of example only and is not intended to limit the claimed invention.

As used in the specification and claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. In addition, when values are expressed as approximations, by use of the antecedent "about," it will be understood that the particular value forms another embodiment. All ranges are inclusive and combinable.

Nanoparticles ranging in size and composition can embedded in the walls of carbon nanotubes during the chemical vapor deposition (CVD) process in accordance with the instant invention. Multifunctionality can, therefore, be added to carbon nanotubes in a single step, avoiding complex and potentially damaging chemical processes to create anchor points for particles on nanotube walls as done by common decoration techniques. Gold and iron oxide nanoparticles, for example, can be used for surface enhancement Raman spectroscopy and magnetic manipulation, respectively. Upon annealing, silicon carbide nanoparticles and nanodiamonds can be transformed into hollow carbon onions embedded in the walls of the nanotubes as anchoring points between the graphene sheets of the tube. When the particles are only partially embedded in the walls of the nanotubes, additional carbon layers can grow inside the hollow cavity of the tube covering these particles and producing hillocks inside the nanotubes. These features can be used for fluid mixing or separation at the nanoscale. Iron oxide particles are partially reduced to metallic iron during the CVD process and act as catalyst for small multi-wall carbon nanotube growth inside the CVD-nanotubes. These structures can be used for mixing or separation of bio-polymers and nanoparticles from the fluid.

The presence of particles inside nanotubes, assuming they do not block the tube channel completely, may be beneficial in nanofluidic devices. Fluid mixing currently represents an obstacle to development of functional micro- and nano-fluidic devices. It has been shown that fluid flow in nanochannels is laminar. See, Majumder, et al., Nature 2005; 438(7064): 44. As a result, fluid mixing in a narrow channel is very difficult. Complex micro-fluidic circuits have been designed to solve this problem, but all involve valves or some kind of actuation (Cho, et al., J Microelectromech Sys. 2003; 12(1): 70-80) which is very difficult to incorporate into nanotube-based nanofluidic devices (Riegelman, et al., J Fluids Eng. 2006; 128(1): 6-13).

The present invention presents a different approach from the art based on embedding nanoparticles inside the walls of CVD-carbon nanotubes during the synthesis process. Different kinds of nanoparticles have been used to add different functionalities to the resulting nanotube by producing nanostructures within the walls or inside tube channels without altering the chemistry of the nanotube surfaces.

Although any template suitable for forming carbon nanotubes can be utilized, one preferred embodiments uses anodized aluminum oxide membranes. Such membranes can be made by a method disclosed in Mattia, et al., J. Phys. Chem. B. 2006; 110(20): 9850-5. Such templates typically have pore diameters ranging from 20 to 200 nm and with lengths up to 90 μm.

The solutions of nanoparticles used to contact the template can comprise a wide variety of nanoparticles. While any useful nanoparticle can be used, some preferred particles are gold, iron oxide and SiC and nanodiamonds. One preferred iron oxide is $Fe_3O_4$.

The template is contacted with the solution of nanoparticles for a time sufficient to allow the desired coverage of the template with nanoparticles. In some embodiments, the contacting occurs for 24 hours. The template and solution containing nanoparticles can be exposed to sonication. Sonication techniques are well known in the art and any technique providing suitable results may be utilized.

After the template has been contacted with the nanoparticles solution, the template is separated from the solution. The template is then allowed to dry. The drying step can occur at ambient or under heating conditions. Typical heating conditions include 25-100° C. The drying step can also be performed at atmospheric pressure or at reduced pressure.

The dried template is then subjected to chemical vapor deposition (CVD). CVD can, for example, use thermal decomposition of ethylene as a carbon source at 670° C. for 6 hours without the presence of a catalyst.

Once the desired coverage of the template with carbon is achieved, the template is removed to release the carbon nanotubes. With an aluminum oxide template, removal can be achieved by exposing the template to a basic solution. While any agent which removes the template without an adverse impact on the nanotubes can be used, one preferred basic solution is an aqueous sodium hydroxide solution. Although any base concentration which removes the template can be used, typically the base concentration is from 1 to 10 M. The exposure can occur at any temperature suitable to remove the template. In some embodiments, the exposure temperature is from 25 to 125° C.

After the template is removed from the nanotubes, the nanotubes can be isolated from the basic solution rinsing in de-ionized water using a filter. If desired, the nanotubes can be washed and/or dried.

The invention is illustrated by the following examples which are not intended as being limited.

EXAMPLES

Anodized aluminum oxide membranes, used as templates for CNT growth, were produced with pore diameters ranging from 20 to 200 nm and with lengths up to 90 μm by methods of the template synthesis reported by Mattia, et al., J. Phys. Chem. B. 2006; 110(20): 9850-5 and Kyotani, et al., Chem. Mater. 1995; 7(8): 1427-8.

The templates were immersed in a solution containing nanoparticles (FIG. 1a), sonicated for 10-20 minutes and finally rinsed on filter paper to remove the excess solution (FIG. 1b). CVD was performed at 670° C. for 6 hours using ethylene as a carbon source (FIG. 1c). See, Mattia, et al., Langmuir. 2006; 22(4): 1789-94. Upon removal of the template in boiling 1 M NaOH solution (3 hours in refluxing conditions), free-standing, open-ended, straight nanotubes with nanoparticles embedded in the walls were obtained (FIG. 1d). A SEM micrograph of a membrane after CVD synthesis is shown in FIG. 1e, with an average pore size of 40 nm. The resulting nanotubes have a disordered carbon wall structure with average in-plane graphite crystallite size of 2.5 nm. See, Mattia, et al., Langmuir. 2006; 22(4): 1789-94 and Rossi, et al., Nano Lett. 2004 May; 4(5): 989-93.

Gold nanoparticles were prepared by mixing 20 ml of 1 mM solution of hydrochloroauric acid (hydrogen tetrachloroaurate) with 1 ml of 1% trisodium citrate ($Na_3C_6H_5O_7 \cdot 2H_2O$) at boiling temperature with vigorous stirring. See, Turkevich, et al., Discussions of the Faraday Society. 1951; 11: 55-75 and McFarland, et al., J. Chem. Educ. 2004; 81: 544A. Particles had a diameter of 15-30 nm, comparable or slightly larger than the average wall thickness of CVD-nanotubes. Iron oxide nanoparticles ($Fe_3O_4$, average diameter 10 nm, density 1070 kgm$^{-3}$) were delivered from an aqueous ferrofluid solution (EMG 705 from Ferrotec Corporation, 1.2% vol of particles in aqueous solution). See, Korneva, et al., Nano Lett. 2005; 5(5): 879-84. Two ferrofluid concentrations were used, 1 μl of ferrofluid in 1 ml of de-ionized water (corresponding to about 1015 particles per ml of water) and 20 μl of ferrofluid in 1 ml of de-ionized water (corresponding to about 1018 particles per ml of water). Silicon carbide (SiC) nanoparticles (MTI crystal), with an average diameter <30 nm where dispersed in ethanol by sonication. The solution was not stable and particles precipitated after about 30 minutes. Nanodiamonds (UD 90, Nanoblox, Inc.) with crystal size of 5 nm were dispersed in de-ionized water. The nanodiamonds tend to form aggregates with diameters up to 300 nm, which can be partially disaggregated by sonication.

For each type of nanoparticle, the templates were immersed in 10 ml acidic solutions, with pH 5 for Au and pH 6 for $Fe_3O_4$ nanoparticles (FIG. 1(a)). Subsequently, from 0.005 to 1.0 ml of concentrated nanoparticle colloid was added to each solution. In an acidic environment, the alumina template will have a slightly positive charge, thus negatively charged nanoparticles will adhere electrostatically to the template (FIG. 1(b)). After 24 h, the templates were rinsed on filter paper to remove the excess solution, leaving the templates with a controlled amount of particles. CVD was performed at 670° C. for 6 h using ethylene as a carbon source (FIG. 1(c)). Upon removal of the template in boiling 1M NaOH solution (3 h in refluxing conditions), free-standing, open-ended, straight nanotubes with nanoparticles embedded in the walls were obtained (FIG. 1(d)). The resulting nanotubes have a disordered carbon wall structure with an average in-plane graphite crystallite size of 2.5 nm.

The samples were characterized by transmission electron microscopy (TEM) using a JEOL JEM-2010F coupled with an energy dispersive X-ray spectroscopy (EDS) detector from EDAX, and by environmental scanning electron microscopy (ESEM, FEI XL-30). Magnetic properties of the nanotubes filled with iron oxide particles were measured using an alternating gradient magnetometer (Princeton Measurements, Inc.). In the regions below −2.5 kOe and above 2.5 kOe, data points were collected every 100 Oe; inside this interval, points were collected every 3 Oe to increase data accuracy in the hysteresis region.

X-ray diffraction (XRD) patterns were recorded using a Siemens XRD with Cu Kα source. Surface enhanced Raman spectra were recorded using a Raman micro-spectrometer (Renishaw 1000) and a diode laser (785 nm excitation wavelength). UV/vis spectra on solid samples were taken with a Perkin Elmer UV/vis/NIR spectrophotometer Lambda 950 equipped with a 60 mm integrating sphere.

Figure 2:
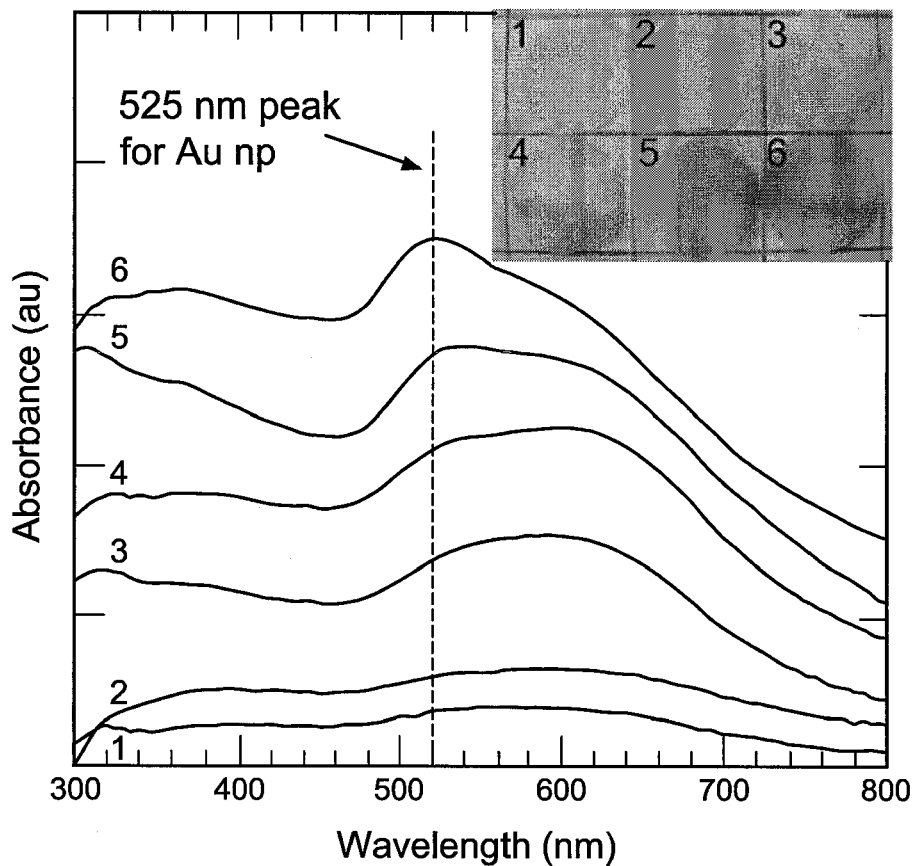
FIG. 2 presents UV-vis spectra of alumina membranes after immersion in acid solutions (pH ~5) with increasing concentration of Au nanoparticles. Spectra 1 to 6 correspond to 0.025, 0.05, 0.125, 0.25, 0.375, and 0.5 ml of nanoparticle solution in 10 ml of $H_2O$, respectively. The inset shows the actual membranes with a diameter of 13 mm.

UV-Vis absorption spectra of membranes, immersed in solutions with increasing Au nanoparticle concentration, show an increase in the peak for gold at 525 nm (FIG. 2). Thus, it is possible to control the amount of particles embedded in the walls of the nanotubes.

Figure 3:
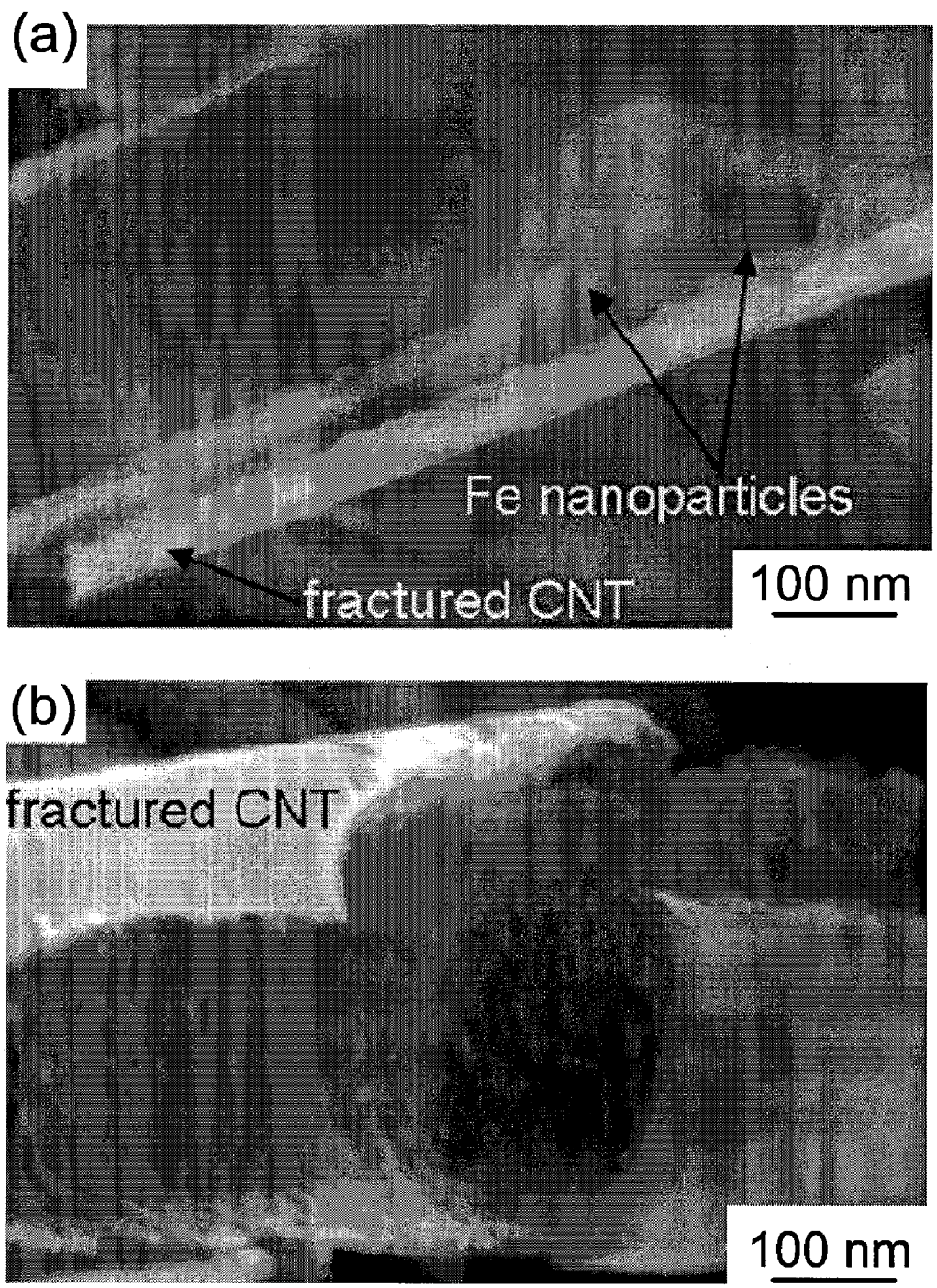
FIG. 3 presents SEM micrographs of fractured nanotubes with an outer, smooth shell and an internal shell with (a) low density of Fe nanoparticles and (b) high density, uniform distribution of Au nanoparticles.
Figure 4:
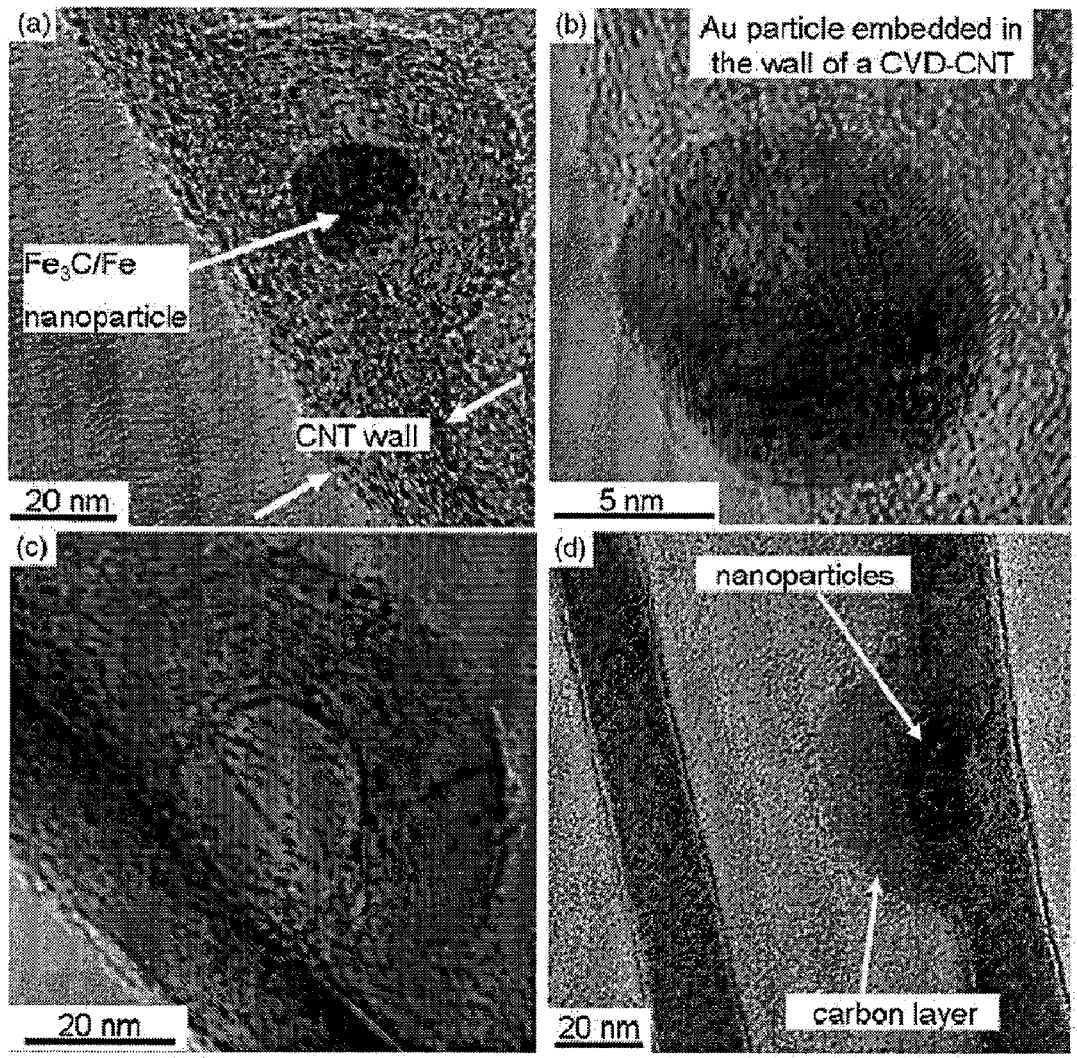
FIG. 4 presents TEM micrographs of particles embedded in CNT walls: (a) Fe and (b) Au nanoparticles. (c) Empty cavity after evaporation of the Au particle during annealing. (d) Hillock grown around an aggregate of particles inside the cavity of a CVD-CNT.

SEM micrographs of fractured nanotubes show an external smooth shell and an internal wall characterized by the presence of hillocks or bumps with a low density of particles (FIG. 3(a), 0.025 ml Au np solution) or a high density, uniform distribution of particles (FIG. 3(b), 0.25 ml of Au np solution). These 'bumps' can only be due to the presence of the nanoparticles, because the average in-plane graphite crystallite size of 2.5 nm is too small to account for surface roughness in the order of tens of nanometers. The external wall, which replicates the pore surface, appears smooth at the magnification used in FIG. 3. TEM analysis indeed confirms this hypothesis, showing, for example, a FeC-based nanoparticle completely surrounded by carbon (FIG. 4(a)). A higher resolution TEM image further confirms that the particle is embedded in the wall and does not sit on the tube surface by showing carbon grown around a gold particle, with both the carbon and the crystal lattice of the metal particle being in focus at the same time (FIG. 4(b)). The composition of the Au particle was confirmed by EDS (not shown).

Annealing for 2 h at 2000° C. in vacuum ($10^{-6}$ Torr), caused the CVD CNT nanotube to graphitize, forming an ordered graphitic MWNT. This process causes the evaporation of the metallic particles, while the carbon structure covering the nanoparticle is retained (FIG. 4(c)). This further confirms that the particles are embedded in the walls of the tube. Interestingly, the thickness of this curved carbon covering the exposed portion of the particle is approximately the same as of the nanotube wall.

When the higher concentrations of particle colloid are used, agglomerates may form, which are not completely embedded in the walls but protrude inside the hollow cavity of the tube (as in FIG. 3). The exposed surface is covered by CVD carbon, with the formation of hillocks, with sizes comparable to the bore of the nanotube (FIG. 4(d)).

In the case of ferrofluid, nanoparticles that were not completely embedded in the walls of the CVD tubes acted as catalysts for the growth of small (20-30 nm in diameter) MWNTs.

Figure 5:
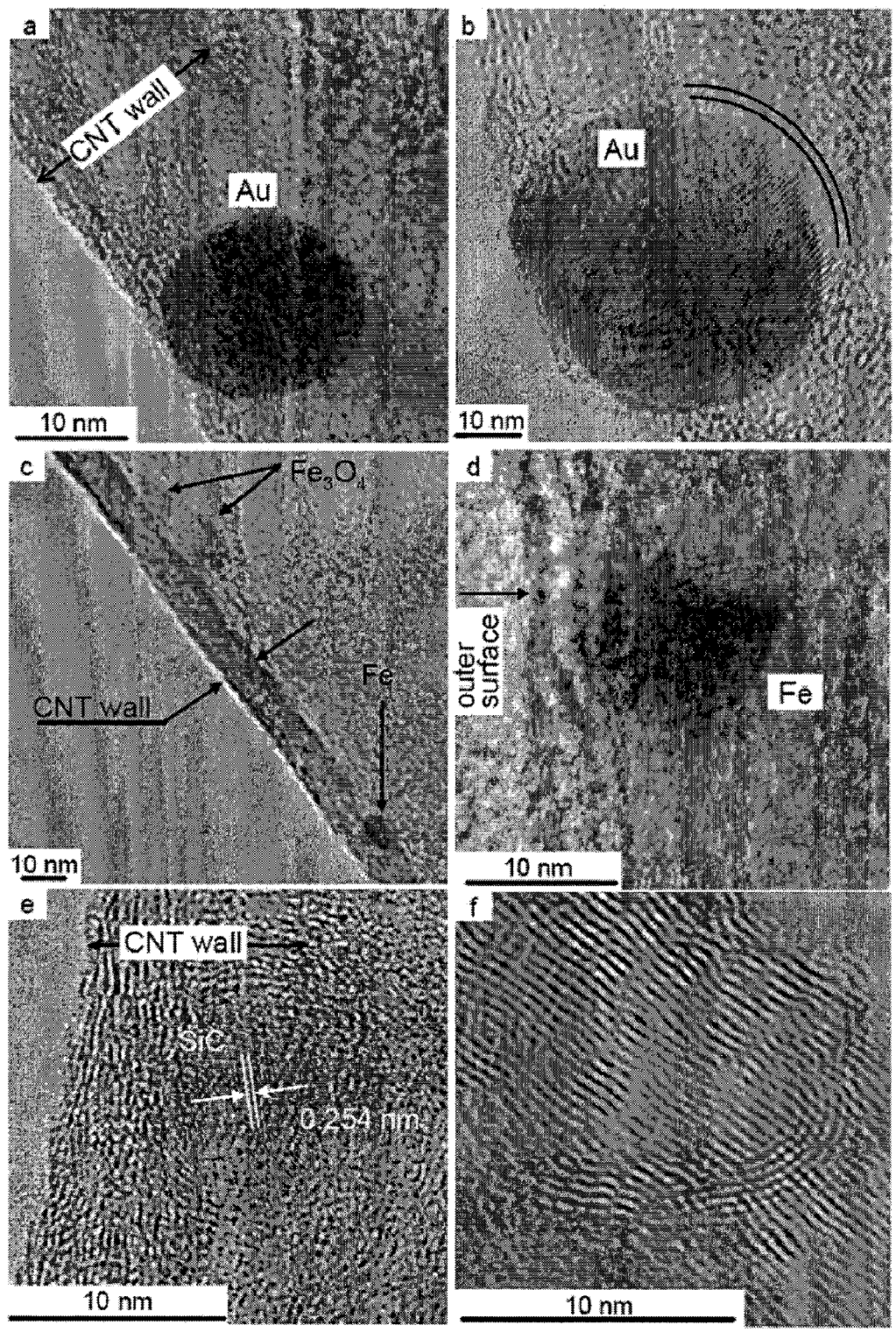
FIG. 5 presents Transmission Electron Microscopy (TEM) micrographs of particles embedded in CNT walls: a) and (b) gold nanoparticles, c) and (d) iron oxide nanoparticles in as-produced, disordered carbon nanotubes. e) SiC nanoparticle and f) hollow carbon onion resulting from annealing of CNT embedded with SiC nanoparticles.

Nanocomposites were synthesized using nanoparticles with diameters comparable to the average thickness of the DVD-nanotube walls. As an example, gold nanoparticles were embedded in the walls of the nanotubes (FIG. 5a). The composition of the particles was confirmed by energy dispersive spectroscopy analysis. In this case, there are only one or two carbon layers surrounding the Au particle (FIG. 5b), which can, if necessary, be removed by mild oxidation to use these particles as sites for surface enhanced Raman spectroscopy (SERS). See, Pieczonka, et al., ChemPhysChem 2005; 6(12): 2473-84. It appears also that graphene sheets in the carbon layers are aligned around the particles similar to how they align along the surface of alumina (FIG. 5b).

Smaller particles, such as iron oxide with a diameter of about 10 nm, have also been embedded in the walls of CVD-nanotubes. Using 1 µl of ferrofluid in 1 ml of $H_2O$, the particle density inside the membrane is relatively low (FIG. 5c), and, as a result, the particles are completely surrounded by several layers of carbon (FIG. 5d). Carbon nanotubes filled with the same kind of iron oxide nanoparticles used in this work were shown to align when placed in a magnetic field. See, Korneva, et al., Nano Lett. 2005; 5(5): 879-84. However, filling the tubes with ferrofluid can clog the cavity of the CNT obstructing the flow of liquid through it. In the present work, on the other hand, iron oxide particles embedded in the walls of nanotubes would allow CNTs alignment in presence of a magnetic field without interfering with the fluid flow inside the CNTs.

Nanoparticles may also be used to reinforce the nanotubes structure acting as anchoring sites between the graphene sheets making up the nanotube. Silicon carbide particles were embedded in the walls of CVD-nanotubes (FIG. 5e). Subsequently, the nanotubes were annealed for 2 hours up to 2000° C. in vacuum (10-6 Torr). This treatment is known to cause graphitization of CVD CNT and formation of ordered graphitic MWNT. See, Mattia, et al., J. Phys. Chem. B. 2006; 110(20): 9850-5. As a result, the particles converted to hollow carbon onions or polygonal carbon particles interpenetrated inside the walls of the tubes. A high resolution TEM image shows the graphitic rings forming the onion (FIG. 5f). The onions appear to be slightly polygonized. Similar results were obtained by embedding smaller nanodiamonds with particle size 4-5 nm. In this case, the particles were smaller and sometimes difficult to distinguish inside the carbon tube walls.

Figure 6:
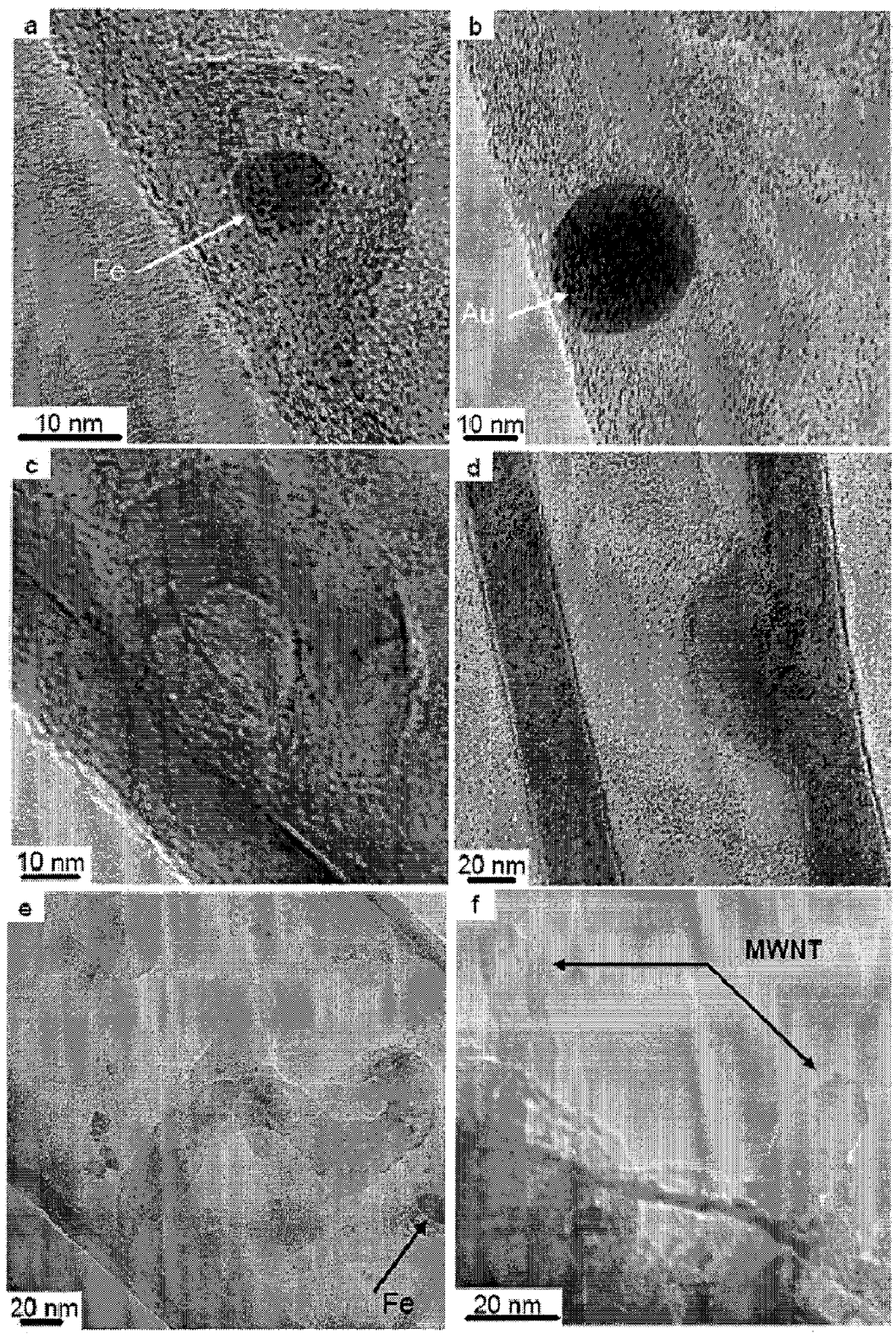
FIG. 6 presents TEM micrographs of secondary structures grown inside the cavity of CNTs: Additional carbon layers grown on a) iron oxide, b) Au and d) SiC nanoparticles partially embedded in the walls. c) Empty cavity after evaporation of Au particle during annealing at 2000° C. for 2 hours. e) MWNTs grown from partially reduced iron particles inside the CVD-nanotubes. f) Secondary grown MWNTs protruding outside an open end of a CVD-nanotube.

When a particle is not completely embedded inside the nanotube wall with a part of it protruding inside the cavity of the nanotubes, additional carbon layers grow to cover the exposed surface, as shown for an iron oxide particle in FIG. 6a and for an Au particle in FIG. 6b. Interestingly, the thickness of this curved carbon covering the exposed portion of the particle is approximately the same as of the nanotube wall. If the nanotube is annealed for 2 hours at 2000° C., a graphitic multi-wall carbon nanotube is obtained and the carbon structure covering the initial nanoparticle is retained, with the particle evaporating during the annealing (FIG. 6c). These structures occupy a considerable part of the hollow cavity of nanotubes (FIG. 6d), making this configuration very similar to a macroscopic static mixer used to modify flow dynamics and to mix or separate incoming fluids. See, Fradette, et al., Chem. Eng. Sci. 2006; 61(11): 3506-18. Such static mixing would be very important at the nanoscale, where use of moving components is extremely difficult.

Figure 7:
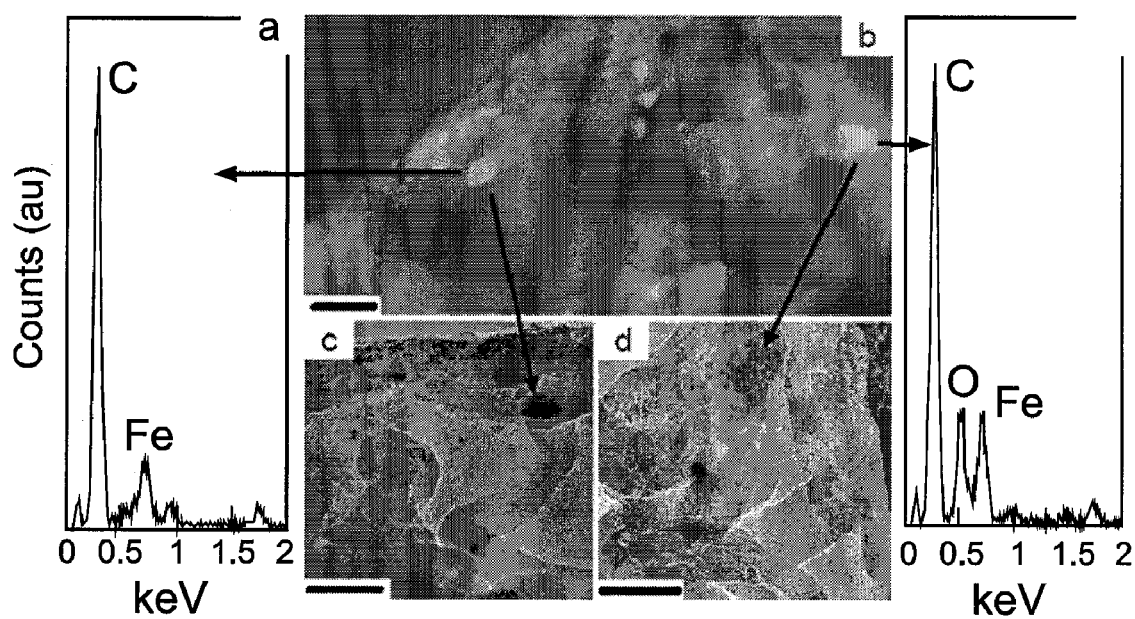
FIG. 7 presents elemental analysis of catalyst particles inside CVD-nanotubes: a) EDS spectrum of an iron particle from which growth of a secondary MWNT originated. b) Scanning Transmission Electron Microscopy (STEM) image of a CVD-nanotube filled with MWNTs grown from $Fe_3O_4$-reduced iron particles. c) TEM image of the iron particle originating MWNT growth. d) TEM image of a larger iron oxide particle agglomerate not catalyzing the growth of a secondary MWNT. e) EDS spectrum of the particle aggregate highlighted in (d) showing peaks of iron and oxygen. The scale bar is 50 nm.

When the higher concentration of $Fe_3O_4$ particles is used (20 µl of ferrofluid dispersed in 1 ml of $H_2O$), the chances of having iron oxide particles not being embedded in the walls but rather remaining loose inside the nanotube channel increase. These particles are not completely covered by carbon in the beginning of the CVD process and give rise to the growth of secondary nanotubes inside the CVD tube (FIG. 6e). The secondary nanotubes are graphitic MWNT with diameters between 10 and 30 nm (FIG. 6f). Their ordered graphitic walls suggest the catalytic growth mechanism. It is well known that iron nanoparticles act as a catalyst for nanotube growth and, given the CVD synthesis conditions, some of the iron oxide particles are reduced to iron and initiate the growth of MWNT. Particles small enough to be embedded into carbon either in the walls (FIG. 6d) or giving rise to the growth of secondary MWNTs (FIG. 7c) give EDS spectrum showing only carbon and iron (FIG. 7a). On the other hand, larger particle agglomerates (FIG. 7d), from which no nanotube growth is observed, show oxygen peak in the EDS spectrum (FIG. 7e). The distribution of iron containing particles in the CVD-nanotube can be seen in a scanning TEM (STEM) image (FIG. 7b). Similar results have been reported recently by a two-step process involving, first, synthesis of CVD-nanotubes, then filling with metal catalyst particles and, finally, performing CVD to grow secondary nanotubes. See, Zhao, et al., Carbon 2006; 44(7): 1310-3. These secondary structures may be used for liquid mixing similar to hillocks, but also for filtration of nanoparticles and large biomolecules.

These magnetically active tubes could also be manipulated through magnetic assembly in micro- and nano-devices. See, Korneva, et al., Nano Lett. 2005; 5(5): 879-84. Magnetic manipulation may also be employed to guide magnetic tubes loaded with drugs to a specific location inside a cell or for biosensing. See, Graham, et al., Biotechnology 2004 September; 22(9): 455-62.

Figure 8:
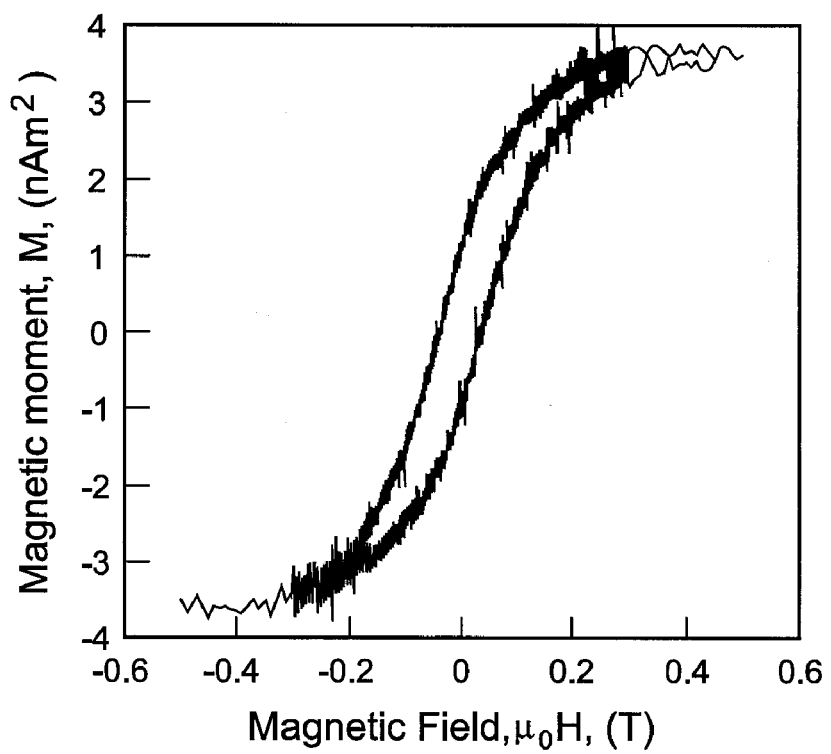
FIG. 8 presents typical magnetization curves of a fragment of alumina membrane before CVD, containing iron oxide nanoparticles, and after CVD, containing carbon nanotubes with iron-based particles embedded in the walls.

A fragment of a membrane holding carbon nanotubes with magnetic particles embedded in the walls, which was prepared using the lower ferrofluid concentration (1 µl of ferrofluid dispersed in 1 ml of $H_2O$), after CVD process was placed in a magnetometer to measure average magnetic properties. A typical magnetization curve showed a weak ferromagnetic behavior (FIG. 8) with an average magnetic moment, $M=3.63*10^{-9}$ $Am^2$. In the regions below −0.25 T and above 0.25 T, data points were collected every $3*10^{-4}$ T; inside this interval, points were collected every 0.01 T to increase data accuracy in the hysteresis region.

Figure 13:
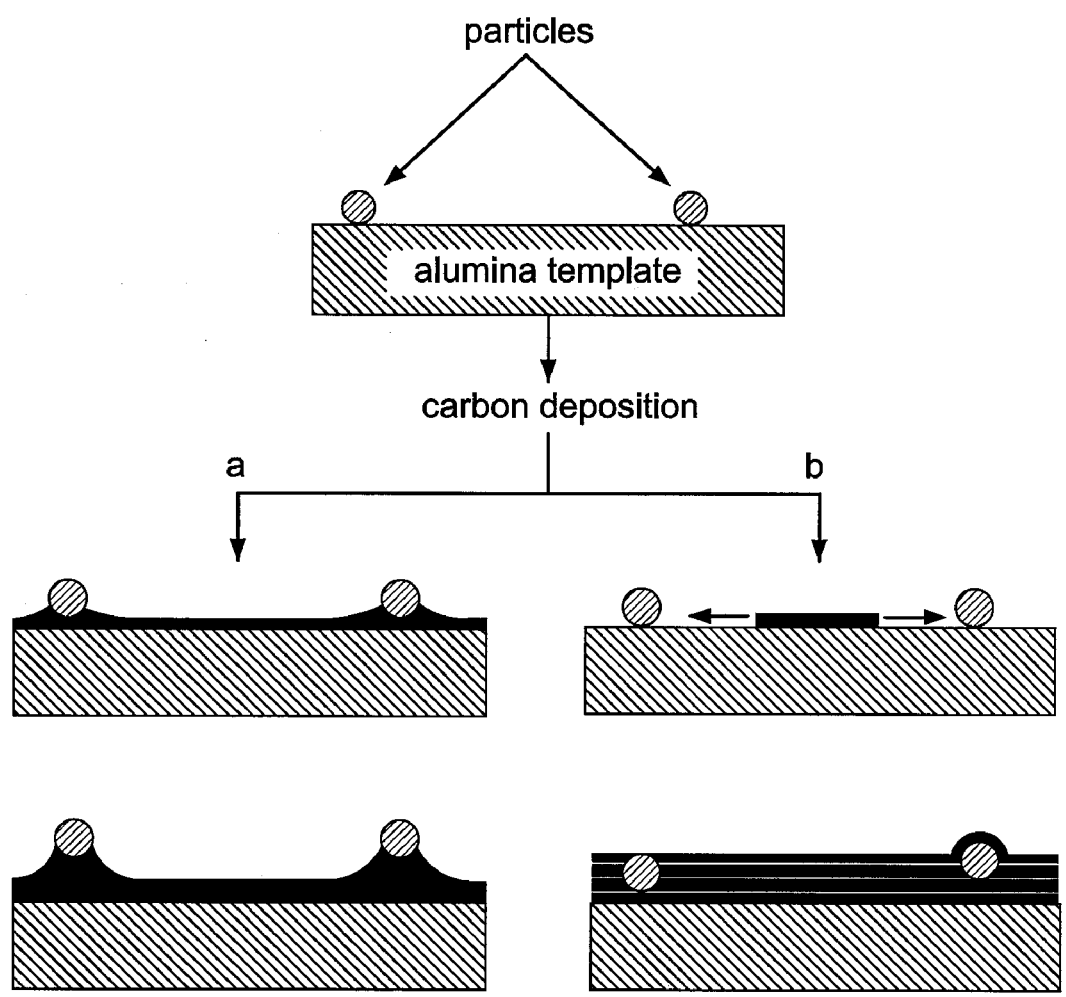
FIG. 13 presents examples of growth mechanisms for CNTs with particles embedded in the walls: (a) tip-growth mechanism, with particles lifted from the membrane pore wall due to the formation of a metal carbide particle and further dissolution of carbon in the carbide with subsequent lift of the particle (b) carbon first deposits on the alumina and forms a continuous layer due to the faster growth kinetic in the planar direction; eventually, carbon layers lift the particles and then trap them inside the tube walls.

TEM and SEM results both show that the nanoparticles are lifted from the template pore walls, and embedded in carbon deposited on the template during the CVD process. This appears to be counterintuitive because the particles were located on the template pore walls due to electrostatic attraction. However, our results are in agreement with those regarding the embedding of nickel oxide particles in the walls of nanotubes during corona discharge CVD (Yu, et al., Diamond Relat. Mater. 15, 1217-22). The authors suggested that the detachment of the particles is due to the formation of nickel carbides with the subsequent diffusion of carbon in the carbide similar to the catalyst tip-growth mechanism of nanotubes (Id.). Although this might be possible in the case of iron oxide, our results for gold nanoparticles cannot be explained by that mechanism. In addition, if the tip growth was to occur, morphology similar to that in FIG. 13(a) should have been observed: a faster growth where the carbide particle is located and slower growth in areas between particles due to a concentration gradient of the diffusing carbon.

On the other hand, it is well known that graphite crystallites during CVD deposit with the basal plane parallel to the substrate. See, Pierson 1999 Handbook of Chemical Vapor Deposition (CVD) $2^{nd}$ ed (Park Ridge, N.J.: Noyes Publications. Furthermore, upon graphitization, CVD nanotubes prepared in the same way as in this work but without particles, transformed in MWNTs with concentric walls. Therefore, we suggest that carbon starts to deposit on the uncovered alumina template pore wall, further expanding along the pore wall (FIG. 13(b)). Once the carbon growing along the pore wall reaches a particle, it begins to lift it off from the substrate. The process continues, with the simultaneous formation of an equally thick layer of carbon on the nanoparticles that are still exposed in the cavity of the tubes (FIG. 4(c)).

A droplet of CNT suspension in ethanol was placed on a clean silicon wafer and allowed to dry. Subsequently, a drop of an aqueous solution containing 1 mM of glycine, with pH 4, was placed on top of the CNTs on the Si wafer. Because CVD nanotubes are hydrophilic, and can be filled with water, it is reasonable to assume that glycine solution filled the tube.

Figure 10:
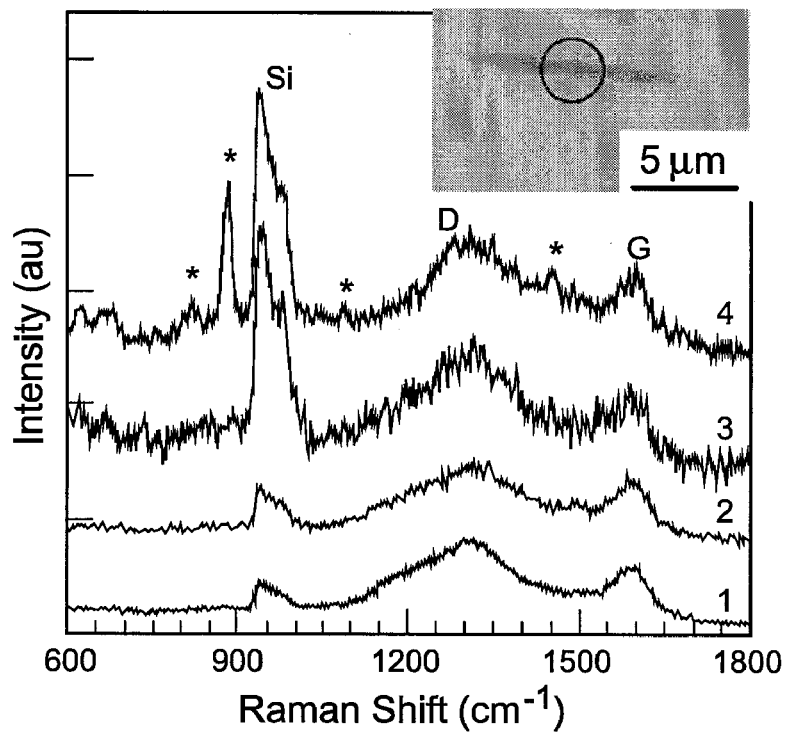
FIG. 10 presents Raman spectra of (1) as-produced CNT; (2) as-produced CNT with glycine; (3) CNT with Au particles embedded in the walls; and (4) CNT with Au particles embedded in the walls with glycine. The inset shows an optical image of the actual CNT (diameter ~200 nm) from which spectrum 4 was recorded on a Si surface. The empty circle represents the spot size of the laser beam.

Raman spectra of CVD carbon nanotubes with and without Au nanoparticles (FIG. 10, curves 3 and 1, respectively) show no significant difference. The addition of CNTs without Au particles to the glycine solution yielded no enhancement (FIG. 10, curve 2), while signal enhancement was achieved only with nanotubes with gold particles embedded in the walls in glycine solution. Four additional peaks appeared at about 820, 880, 1085, and 1452 $cm^{-1}$ (FIG. 10, curve 4). Because the concentration of glycine in the solution is too low to be observed by the conventional Raman technique (Dou, et al., Appl. Spectrosc. 1999, 53, 1440-7), glycine outside the nanotube cannot yield any signal. Therefore, the SERS signal for glycine can only be coming from glycine molecules close to the Au nanoparticles, which are mainly inside the nanotube (FIG. 3). In addition, the thin layer of carbon covering the particles might be damping the signal, thus partially explaining the moderate glycine signal intensity. Comparison of these results to SERS of glycine in an Au colloid solution shows an upshift of about 5-10 $cm^{-1}$ of the glycine peaks, possibly due the presence of the carbon layer between the gold and the glycine. This result opens the way to the development of nanotube-based SERS probes for the detection of extremely small amounts of biological and chemical components dispersed in liquids, or cellular research.

Figure 11:
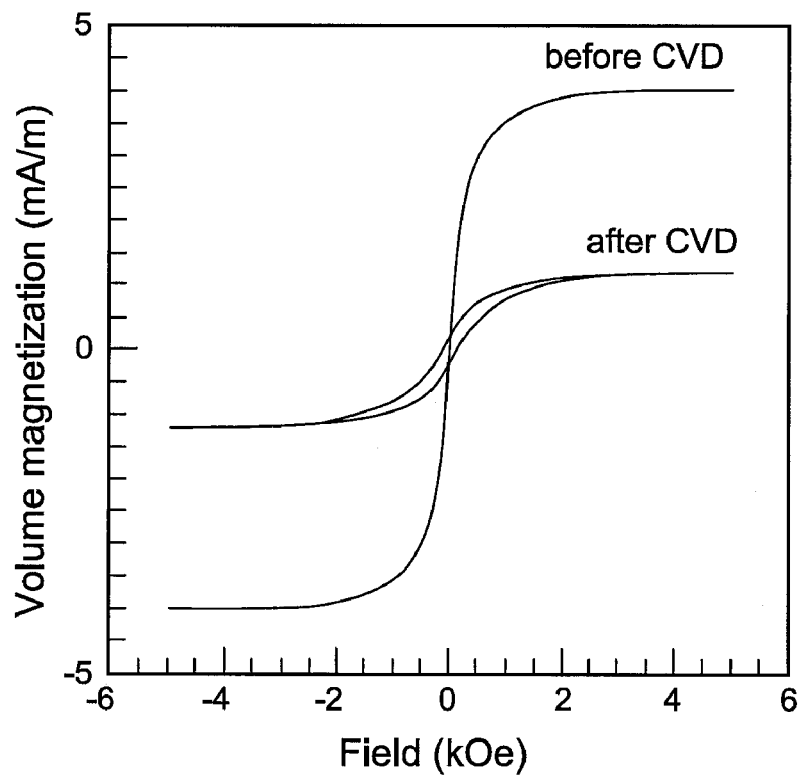
FIG. 11 presents typical magnetization curves of a fragment of alumina membrane before CVD, containing iron oxide nanoparticles, and after CVD, containing carbon nanotubes with iron-based particles embedded in the walls.

Fragments of membranes filled with magnetic particles before and after CVD treatment were placed in a magnetometer to measure the average magnetic properties. Typical volume magnetization curves for the membranes before and after CVD show a paramagnetic and a ferromagnetic behavior, respectively (1.0 ml ferrofluid solution in 10 ml $H_2O$, FIG. 11).

Figure 12:
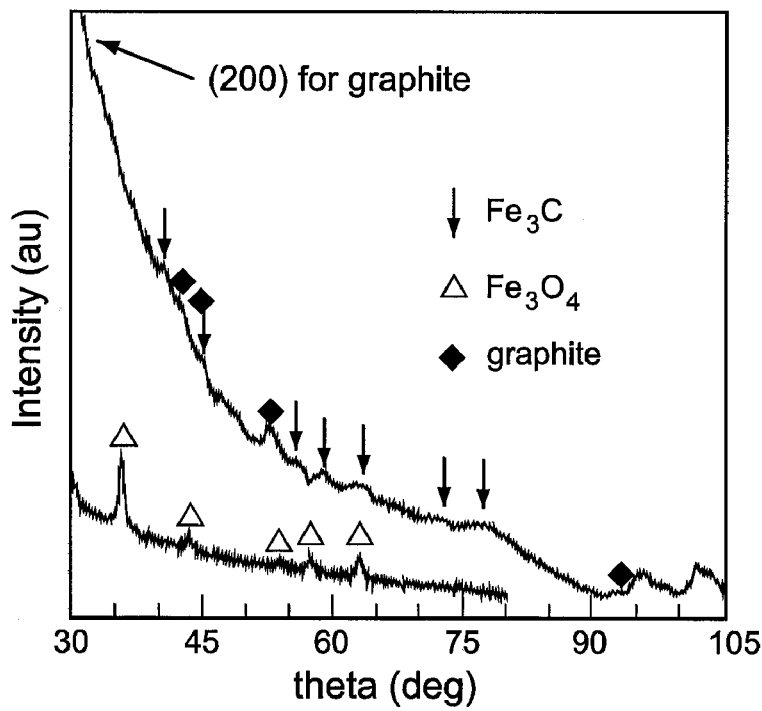
FIG. 12 presents XRD patterns for the ferrofluid particles prior to CVD (lower curve) and for the CNTs with the iron/iron carbide particles embedded in their walls (upper curve).

The value of the volume saturation magnetization after CVD is about three times smaller than before CVD and the behavior has changed from paramagnetic (no hysteresis) to ferromagnetic (with hysteresis). X-ray diffraction patterns show the presence of iron carbide ($Fe_3C$) after CVD and no peaks for $Fe_3O_4$ (FIG. 12). It is well known that iron carbide can be produced by hydrogen reduction of iron oxide to metallic iron and subsequent partial carburization, with a metallic iron residue (Hofer, et al., J. Am. Chem. Soc. 1959, 81, 1576-82). Hence, the reduction in saturation magnetization can be attributed to the replacement of some iron oxide by iron carbide, which has a saturation magnetization three orders of magnitude smaller than iron and two orders of magnitude smaller than $Fe_3O_4$. The ferromagnetic behavior is attributed to the residual metallic iron whose presence, although not visible in the XRD pattern, is also confirmed by the fact that MWNTs grow from iron-containing catalyst particles inside the CVD nanotubes. Finally, EDS analysis of nanoparticles from which MWNTs originate shows peaks for carbon and iron alone, while EDS for larger particle agglomerates still show the presence of oxygen.

Figure 9:
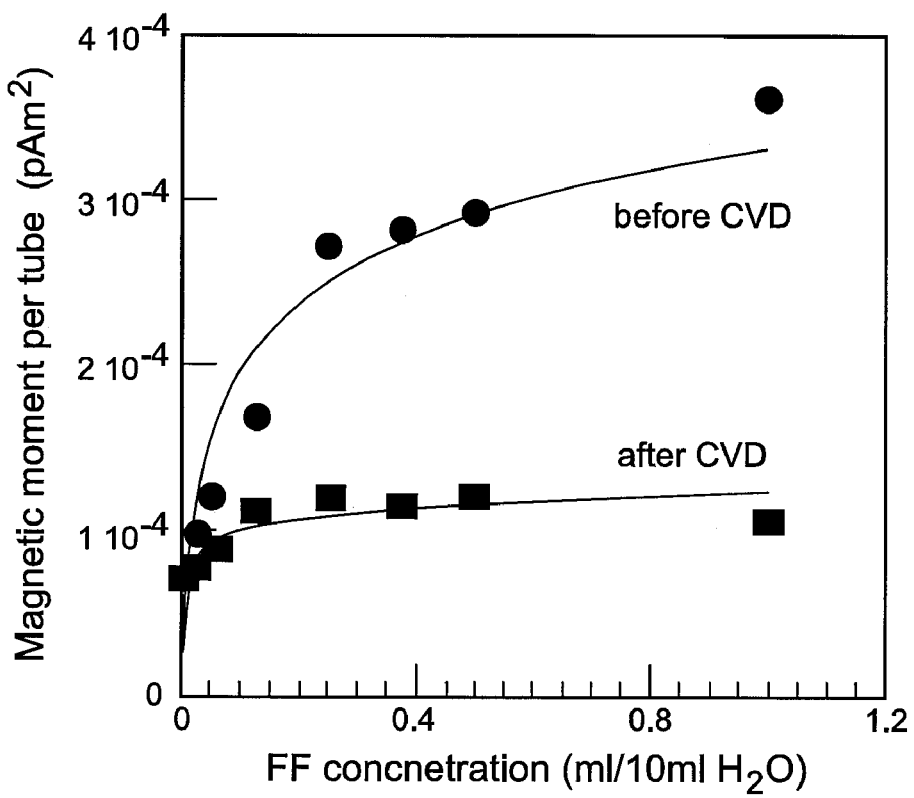
FIG. 9 presents magnetic moment per CNT before and after CVD synthesis as a function of the initial ferrofluid concentration.

The magnetic moment per nanotube can be calculated by the following formula (Korneva, et al., Nano Lett. 2005, 5, 879-84):

$$m=M(d2\pi)/(4\rho A), \quad (1)$$

where M is the volume magnetization, d=200 nm is the average diameter of CVD nanotubes, $\rho=0.35$ is the surface area fraction of the membrane occupied by nanotubes determined by image analysis of SEM of the membrane surface (Mattia, et al., Langmuir 2006, 22, 1789-94), and A is the area of the membrane fragment analyzed. Comparison of the magnetic moments per tube before and after CVD is reported (FIG. 9), with a magnetic moment per tube of $3.5\times10^{-16}$ $Am^2$ for the highest initial concentration of ferrofluid. Dividing this value by the magnetic moment of the iron oxide particles declared by the vendor, $4.48\times10^{-20}$ $Am^2$, one can estimate the number of particles embedded in each nanotube, to be ~7000. This number is consistent with SEM observations of the tubes.

The highest average magnetic moment per tube achieved in the present work is only one order of magnitude smaller than the value obtained with 300 nm CVD nanotubes filled with the same magnetic particles after the CVD synthesis. Those tubes have been manipulated by means of an external magnetic field, and we believe that the magnetic tubes prepared in this work could also be manipulated in a similar way.

One key advantage, however, of the tubes prepared in this work is that the cavity of the CNT is empty, as is not always the case with tubes whose cavity is filled by magnetic particles. This could allow CNT alignment in the presence of a magnetic field without interfering with fluid flow inside the CNTs. These magnetically active tubes could also be manipulated through magnetic assembly in micro- and nano-devices, or loaded with drugs, driven to a specific location inside a cell or used for biosensing. Magnetic manipulation of nanotubes with magnetic nanoparticles bonded to the outer structure of the nanotubes has already been suggested (Gao, et al., J. Phys. Chem. B 2006, 110, 7213-20), although it is known that metallic nanoparticles can represent a health threat in a biological environment. In the magnetic nanotubes synthesized in this work, metal particles are always covered by a carbon layer which does not allow direct chemical reaction or loss of particles in the environment.

Figure 14:
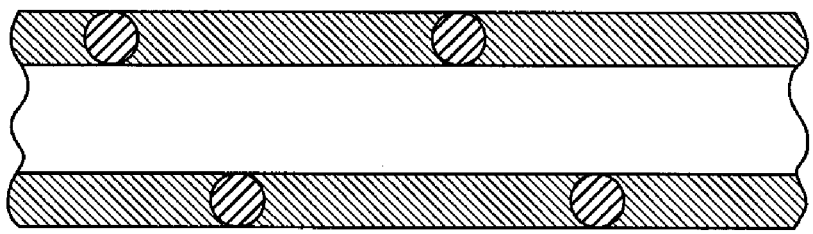
FIG. 14 presents schematics of nanoparticle-CNT composite structures obtained: Particles with size (a) comparable (e.g., Au) or (b) smaller (e.g., $Fe_3O_4$) than typical CVD-nanotube wall thickness. c) Particles (e.g., SiC or nanodiamond) used as anchoring point against wall slippage between the different walls of a MWNT. Secondary structures can be grown (d) on the walls or (e) inside the CNT due to the presence of nanoparticles.
Figure 14:
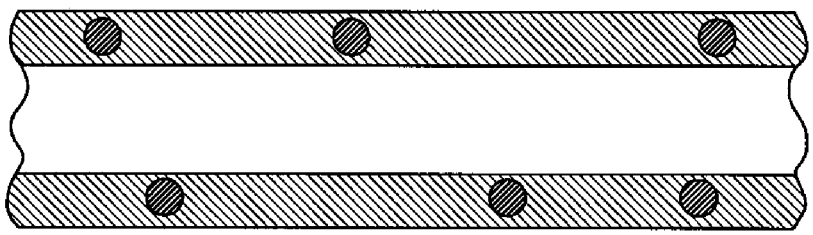
Figure 14:
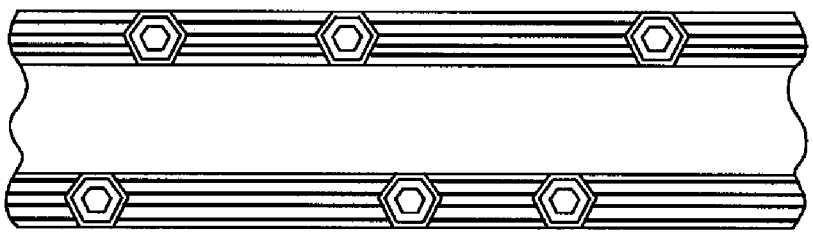
Figure 14:
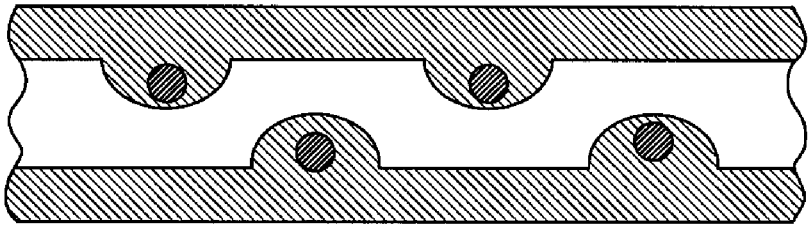
Figure 14:
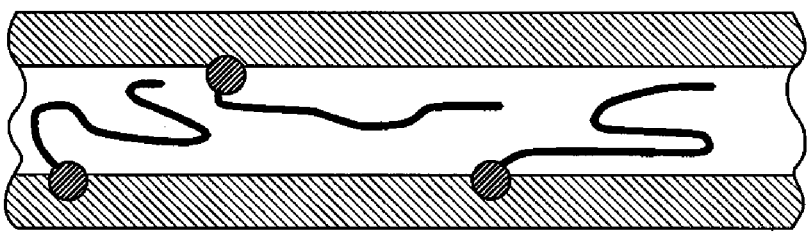

In summary, a one-step synthesis method to add multifunctionality to carbon nanotubes without altering the chemistry and structure of their surfaces has been developed (FIG. 14). Nanoparticles of different size and composition have been embedded in the nanotube walls during the nanotube growth. Embedded metal particles can be used for surface-enhanced Raman scattering (SERS) and/or for magnetic manipulation of the nanotubes (FIGS. 14a and 14b). Inner shell pull-out from annealed nanotubes can be prevented by the presence of hollow carbon onions which act as anchoring points between the graphene sheets constituting a MWNT (FIG. 14c). Such compositions could also assist load transfer between the tube shells in polymer-CNT composites. The formation of hillocks and secondary structures on the internal walls of CVD nanotube can be used to control the flow of liquids inside the tube as well as for fluid mixing and separation (FIGS. 14d and 14e).

What is claimed:

1. A method for producing carbon nanotubes with embedded nanoparticles comprising the steps conducted in the order:
    providing a template comprising an anodized aluminum oxide membrane with a pore diameter of 20-200 nm;
    contacting the template with a solution containing nanoparticles;
    exposing the template and solution containing nanoparticles to sonication;
    separating the template from the solution;
    forming a carbon structure via chemical deposition of carbon on said template; and
    removing the template by exposing the template to a basic solution.

2. The method of claim 1, wherein the chemical deposition of carbon is achieved by chemical vapor deposition (CVD).

3. The method of claim 1, wherein the template is dried after the template is removed from the solution.

4. The method of claim 1, wherein the basic solution is aqueous sodium hydroxide.

5. The method of claim 1, wherein the nanoparticles comprise gold, iron oxide, or SiC.

6. The method of claim 5, wherein the iron oxide comprises $Fe_3O_4$.

7. The method of claim 1, wherein the nanoparticles comprise gold.

8. The method of claim 1, wherein the nanoparticles comprise SiC.

9. A method for producing carbon nanotubes with embedded nanoparticles comprising the steps conducted in the order:
    providing a template;
    contacting the template with a solution containing nanoparticles;
    exposing the template and solution containing nanoparticles to sonication;
    separating the template from the solution;
    forming a carbon structure via chemical deposition of carbon on said template; and
    removing the template by exposing the template to chemical treatment.

10. The method of claim 9, wherein the template comprises an anodized aluminum oxide membrane with a pore diameter of 20-200 nm and the template is removed via exposure to basic solution.

11. The method of claim 9, wherein the chemical deposition of carbon is achieved by chemical vapor deposition (CVD).

12. The method of claim 9, wherein the template is dried after the template is removed from the solution.

13. The method of claim 9, wherein the basic solution is aqueous sodium hydroxide.

14. The method of claim 9, wherein the nanoparticles comprise gold, iron oxide, or SiC.

15. The method of claim 14, wherein the iron oxide comprises $Fe_3O_4$.

16. The method of claim 9, wherein the nanoparticles comprise gold.

17. The method of claim 9, wherein the nanoparticles comprise SiC.

18. A method for producing carbon nanotubes with embedded nanoparticles comprising the steps conducted in the order:
    providing a template comprising an anodized aluminum oxide membrane with a pore diameter of 20-200 nm;
    contacting the template with a solution containing nanoparticles;
    exposing the template and solution containing nanoparticles to sonication;
    separating the template from the solution;
    drying the template;
    forming a carbon structure via chemical deposition of carbon on said template; and
    removing the template by exposing the template to a basic solution.

19. The method of claim 1, wherein the nanoparticles comprise gold, iron oxide, or SiC.

20. The method of claim 1, wherein the basic solution is aqueous sodium hydroxide.

* * * * *